United States Patent
Azusawa et al.

(10) Patent No.: US 11,280,445 B2
(45) Date of Patent: Mar. 22, 2022

(54) STRUCTURAL BODY

(71) Applicant: MITSUBISHI HEAVY INDUSTRIES, LTD., Tokyo (JP)

(72) Inventors: Naoto Azusawa, Tokyo (JP); Takayuki Shimizu, Tokyo (JP); Kenichi Tsuruda, Tokyo (JP); Hiroki Azuma, Tokyo (JP); Takuya Goto, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 562 days.

(21) Appl. No.: 15/561,518

(22) PCT Filed: Jun. 16, 2016

(86) PCT No.: PCT/JP2016/067988
§ 371 (c)(1),
(2) Date: Sep. 25, 2017

(87) PCT Pub. No.: WO2017/006740
PCT Pub. Date: Jan. 12, 2017

(65) Prior Publication Data
US 2018/0066790 A1 Mar. 8, 2018

(30) Foreign Application Priority Data
Jul. 3, 2015 (JP) .............................. JP2015-134395

(51) Int. Cl.
*F16M 11/06* (2006.01)
*G01B 11/00* (2006.01)
(Continued)

(52) U.S. Cl.
CPC ............ *F16M 11/06* (2013.01); *B23Q 3/186* (2013.01); *G01B 5/0002* (2013.01); *G01B 11/00* (2013.01); *G01B 11/002* (2013.01)

(58) Field of Classification Search
CPC .... B62D 65/02; B62D 65/022; B62D 65/024; B62D 65/026; B62D 65/028; F16M 11/04; F16M 11/06; B23Q 3/186
See application file for complete search history.

(56) References Cited

U.S. PATENT DOCUMENTS 6,167,607 B1 * 1/2001 Pryor ................... A01B 69/008
29/407.04
2001/0045021 A1 11/2001 Matsuda et al.
(Continued)

FOREIGN PATENT DOCUMENTS

| CN | 1207528 C | 6/2005 |
| CN | 1989668 A | 6/2007 |

(Continued)

OTHER PUBLICATIONS

Yoichi Kujirai,"Traffic and Transportation Domain Conference (non-official translation)", Jun. 8, 2015, pp. 1-32 (in particular,p. 11),https://www.mhi.co.jp/finance/library/business/pdf/cats2015.pdf, Japan, 34pp.
(Continued)

*Primary Examiner* — Joel D Crandall
(74) *Attorney, Agent, or Firm* — Kanesaka Berner and Partners LLP

(57) ABSTRACT

Provided is a structural body, formed in a plate-like shape and positioned with respect to an assembly jig including a positioning pin and supporting a first surface of the structural body, including a positioning hole formed through an end portion, a positioning protrusion being inserted into the positioning hole; and a pair of first position detection areas formed on a second surface of the end portion through which the positioning hole is formed. The positioning hole is formed apart from an axis line connecting the pair of first position detection areas.

2 Claims, 8 Drawing Sheets

(51) Int. Cl.
*G01B 5/00* (2006.01)
*B23Q 3/18* (2006.01)

(56) References Cited

U.S. PATENT DOCUMENTS

| | | | |
|---|---|---|---|
| 2006/0005989 | A1 | 1/2006 | Swiencicki et al. |
| 2009/0167335 | A1 | 7/2009 | Yamada et al. |
| 2011/0104919 | A1 | 5/2011 | Patel et al. |
| 2011/0205135 | A1 | 8/2011 | Patel et al. |

FOREIGN PATENT DOCUMENTS

| | | | |
|---|---|---|---|
| CN | 101346633 | A | 1/2009 |
| CN | 201844814 | U | 5/2011 |
| CN | 204228109 | U | 3/2015 |
| CN | 204440418 | U | 7/2015 |
| JP | H04223359 | A | 8/1992 |
| JP | 7-57087 | A | 3/1995 |
| JP | H08020369 | A | 1/1996 |
| JP | H08172140 | A | 7/1996 |
| JP | 11-138743 | A | 5/1999 |
| JP | H11295038 | A | 10/1999 |
| JP | 2000-52194 | A | 2/2000 |
| JP | 2000052194 | A | 2/2000 |
| JP | 2002290033 | A | 10/2002 |
| JP | 3573608 | B2 * | 10/2004 |
| JP | 2009-192762 | A | 8/2009 |
| JP | 2009-220247 | A | 10/2009 |
| JP | 2009220247 | A | 10/2009 |
| JP | 2009-269110 | A | 11/2009 |
| JP | 2010-117223 | A | 5/2010 |
| JP | 2010-243405 | A | 10/2010 |
| JP | 2015-1465 | A | 1/2015 |
| WO | 2005115111 | A2 | 12/2005 |

OTHER PUBLICATIONS

International Search Report in PCT/JP2016/067988, dated Sep. 13, 2016. 5pp.
Written Opinion in PCT/JP2016/067988, dated Sep. 13, 2016. 11pp.
Extended European Search Report in EP Application No. 16821210.8, dated Jan. 15, 2018. 6pp.
Office Action for Chinese Application No. 201680015515.6 dated Mar. 13, 2019; 11pp.
Office Action for Japanese Application No. 2015-134395 dated Apr. 2, 2019; 12pp.

* cited by examiner

STRUCTURAL BODY

RELATED APPLICATIONS

The present application is a National phase of International Application No. PCT/JP2016/067988, filed Jun. 16, 2016, and claims priority based on Japanese Patent Application No. 2015-134395, filed Jul. 3, 2015.

TECHNICAL FIELD

The present invention relates to a structural body in a plate-like shape positioned with the bottom surface of the structural body supported by a positioning device.

BACKGROUND ART

Conventionally, a three-dimensional position measurement device for measuring a three-dimensional position of a subject using a camera equipped to a robot is known (e.g., refer to Patent Document 1).

The three-dimensional position measurement device disclosed in Patent Document 1 is a device that extracts feature points of a subject by imaging the subject at a plurality of positions, and performs stereo measurement of a three-dimensional position of the subject on the basis of both the feature points thus extracted and the locations of the camera used for the imaging.

CITATION LIST

Patent Literature

Patent Document 1: Japanese Unexamined Patent Application Publication No. 2010-117223A

SUMMARY OF INVENTION

Technical Problems

In positioning a structural body on a positioning device, the structural body, for example, being coupled to other members and thus assembled, the position and posture of a portion to be positioned with respect to the positioning device is required to be accurately recognized.

Unfortunately, Patent Document 1 merely discloses measurement of the three-dimensional position of an entire of the subject, and never discloses an accurate recognition of the position and posture of a portion to be positioned.

The present invention has been accomplished under such circumstances and aims to provide a structural body in which the position and angle of a portion to be positioned with respect to a positioning device can be accurately recognized.

Solution to Problem

To achieve the above-described objects, the present invention adopts following means.

A structural body according an aspect of the present invention is formed into a plate-like shape and positioned with respect to a positioning device including a positioning protrusion and supporting a first surface of the structural body, the structural body including a positioning hole formed through an end portion, the positioning protrusion being inserted into the positioning hole; and a pair of first position detection areas formed on a second surface of the end portion through which the positioning hole is formed. The positioning hole is formed apart from an axis line connecting the pair of first position detection areas.

According to the structural body of an aspect of the present invention, since the positioning hole and the pair of first position detection areas are formed at the end portion of the second surface when a surface supported by the positioning device is a first surface, the position and angle of the structural body can be accurately recognized by an imaging apparatus and the like in a portion that is positioned at the positioning protrusion of the positioning device.

Specifically, the recognition accuracy can be significantly enhanced as compared to cases where the position and angle of the structural body are recognized on the basis of a shape of an end portion of the structural body.

This is because the use of the shape of the end portion of the structural body as a reference may lead to an inaccurate recognition due to an error in processing accuracy unless the processing accuracy of the shape is ensured.

Additionally, since the positioning hole is formed at a position apart from an axis line connecting the pair of position detection areas, even if the structural body is positioned at any angle, the angle of the structural body can be reliably recognized using the image information collected by imaging the positioning hole and the pair of first position detection areas.

When the structural body including the positioning hole and the pair of position detection areas, both of which arranged in an identical axis line, rotates around the axis line connecting the hole and areas, the angle of the structural body around the axis line cannot be recognized from the image information.

As described above, according to the structural body of an aspect of the present invention, a structural body can be provided in which the position and posture of a portion to be positioned with respect to a positioning device can be accurately recognized.

The structural body according an aspect of the present invention may be configured such that a pair of the positioning holes are formed through both end portions, a pair of the positioning protrusions being inserted into the pair of the positioning holes; the pair of first position detection areas are formed on the second surface at a first end portion side, a first one of the pair of positioning holes being formed at the first end portion side; a pair of second position detection areas are formed on the second surface at a second end portion side, a second one of the pair of positioning holes being formed at the second end portion side; and the first one of the pair of positioning holes is formed apart from an axis line connecting the pair of first position detection areas, and the second one of the pair of positioning holes is formed apart from an axis line connecting the pair of second position detection areas.

According to the above configuration, since the positioning hole and the pair of position detection areas are formed at each of both end portions of the second surface, the position and angle of the structural body can be recognized with high accuracy in each of both end portions that is positioned at the positioning protrusion of the positioning device.

Specifically, the recognition accuracy can be significantly enhanced as compared to cases where the position and angle of the structural body are recognized on the basis of the shapes of both end portions of the structural body.

This is because the use of the shapes of the both end portions of the structural body as a reference may lead to an inaccurate recognition due to an error in processing accuracy unless the processing accuracy of the shape is ensured.

The structural body according to an aspect of the present invention may be configured such that a pair of protruding sections protruding outwardly in the long side direction are formed at both end portions in the long side direction; the first one of the pair of positioning holes and the pair of first position detection areas are formed on a first one of the pair of protruding sections; and the second one of the pair of positioning holes and the pair of second position detection areas are formed on a second one of the pair of protruding sections.

Thereby, the structural body can be positioned with respect to the positioning device and an assembling work necessitated is performed thereto, and then the pair of protruding sections is cut off. This configuration allows a detection of the position and posture of the structural body to be accurately recognized without performing any process on a portion necessary for the final product.

In the structural body with the above-described configuration, the second surface of the first protruding section may be processed to increase a difference in luminance from the pair of first position detection areas, and the second surface of the second protruding section may be processed to increase a difference in luminance from the pair of second position detection areas.

Thereby, the calculation accuracy can be increased in calculating the positions of the pair of first position detection areas from the image information collected by imaging the pair of first position detection areas with an imaging apparatus.

Similarly, the calculation accuracy can be increased in calculating the positions of the pair of second position detection areas from the image information collected by imaging the pair of second position detection areas with an imaging apparatus.

In the structural body according to an aspect of the present invention, the pair of first position detection areas and the pair of second position detection areas may be through-holes each penetrating the first surface and the second surface.

Since a process for forming a through-hole in the structural body formed in a plate-like shape is a process in which the through-hole can be positioned with relatively high accuracy, the through-hole is used for the pair of first position detection areas and the pair of second position detection areas so that the detection accuracy for the pair of first position detection areas and the pair of second position detection areas is enhanced.

Advantageous Effects of Invention

According to the present invention, a structural body can be provided that allows the position and angle of a portion to be positioned with respect to a positioning device to be accurately recognized.

DESCRIPTION OF EMBODIMENTS

Hereinafter, an assembling system 600 according to one embodiment of the present invention will be described while referencing drawings.

The assembling system 600 of the present embodiment is a system in which a plurality of plate-like structural members 200 (structural body) including a pair of positioning holes 220, 221 formed through both end portions thereof in the long side direction are positioned on an assembly jig 100 (positioning device), thereby assembling the plurality of plate-like structural members 200 by a process such as riveting.

Figure 1:
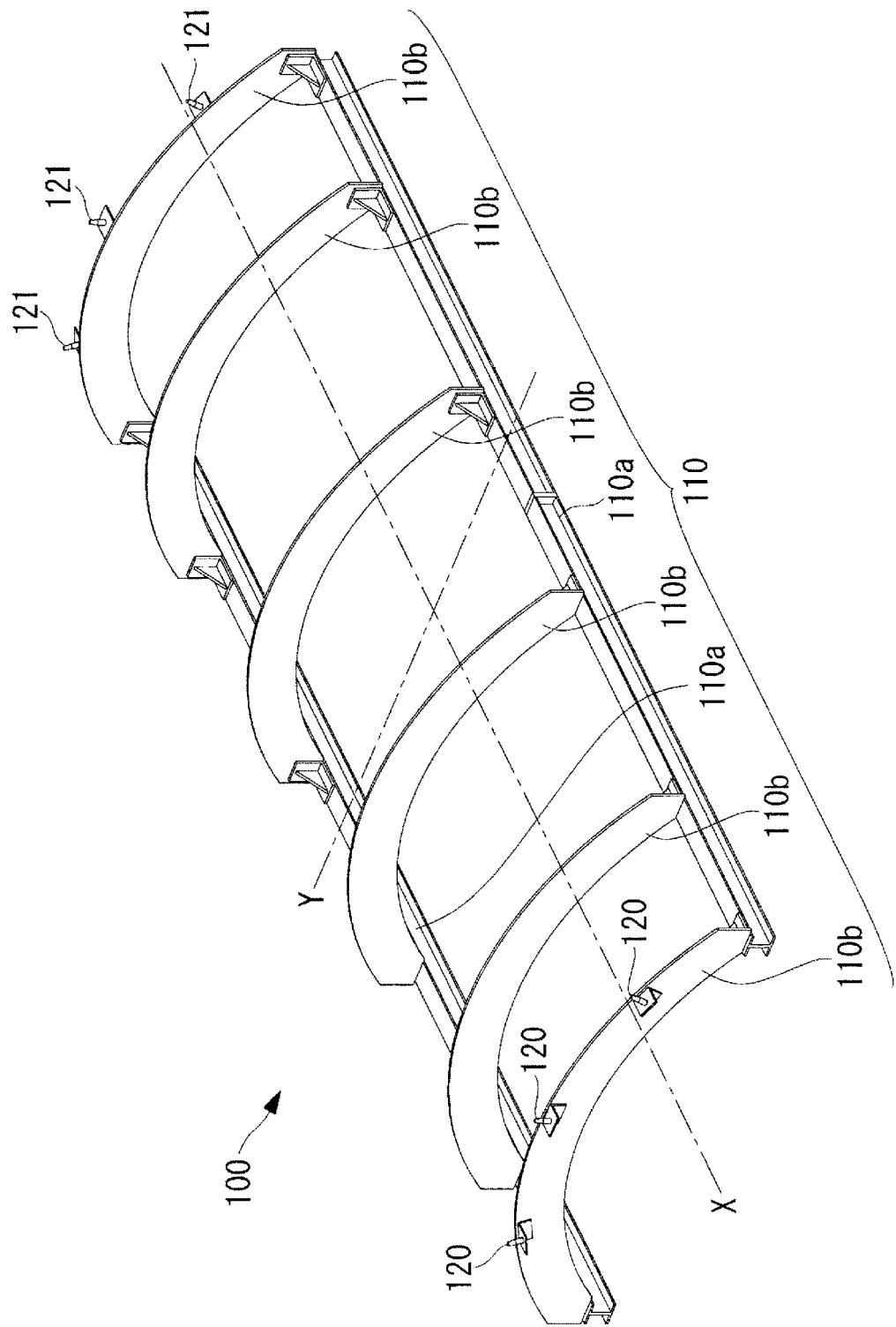
FIG. 1 is a perspective view illustrating an assembly jig.

The assembly jig 100 illustrated in FIG. 1 is a device for positioning the plurality of plate-like structural members 200 each having the pair of positioning holes 220, 221 at both end portions in the long side direction.

As illustrated in FIG. 1, the assembly jig 100 includes a supporting section 110 composed of a pair of first supporting members 110a and a plurality of second supporting members 110b, and a pair of positioning sections 120, 121 attached to the supporting section 110 and configured to allow the plate-like structural member 200 to be positioned with respect to the supporting section 110.

Each of the pair of first supporting members 110a is an elongated member to be arranged in parallel along an axis line X, and is affixed on a mounting surface on which the supporting section 110 is mounted with fastening bolts and the like (not illustrated).

The plurality of second supporting members 110b are members in which one end of each of the plurality of second supporting members 110b is to be affixed to one of the pair of first supporting members 110a, and the other end thereof is to be affixed to the other of the pair of first supporting members 110a.

As illustrated in FIG. 1, each of the plurality of second supporting members 110b is arranged in parallel with an axis line Y orthogonal to the axis line X.

As illustrated in FIG. 1, the second supporting member 110b is formed in an arch shape in which a central portion thereof along the axis line Y protrudes more than the both end portions, with respect to the mounting surface on which the first supporting member 110a is mounted.

The second supporting member 110b is formed in an arch shape having a curvature for supporting a bottom surface of the plate-like structural member 200 along the shape of the bottom surface.

The plurality of second supporting members 110b support the bottom surface (the first surface) of the plate-like structural member 200 at a plurality of positions along the axis line X.

The positioning sections 120, 121 are arranged at the same positions in the axis line Y.

Three pairs of positioning sections 120, 121 are formed at three different positions along the axis line Y in the second supporting members 110b provided at each of both end sides in the axis line X.

The three pairs of positioning sections 120, 121 allow positioning of three plate-like structural members 200.

Figure 3:
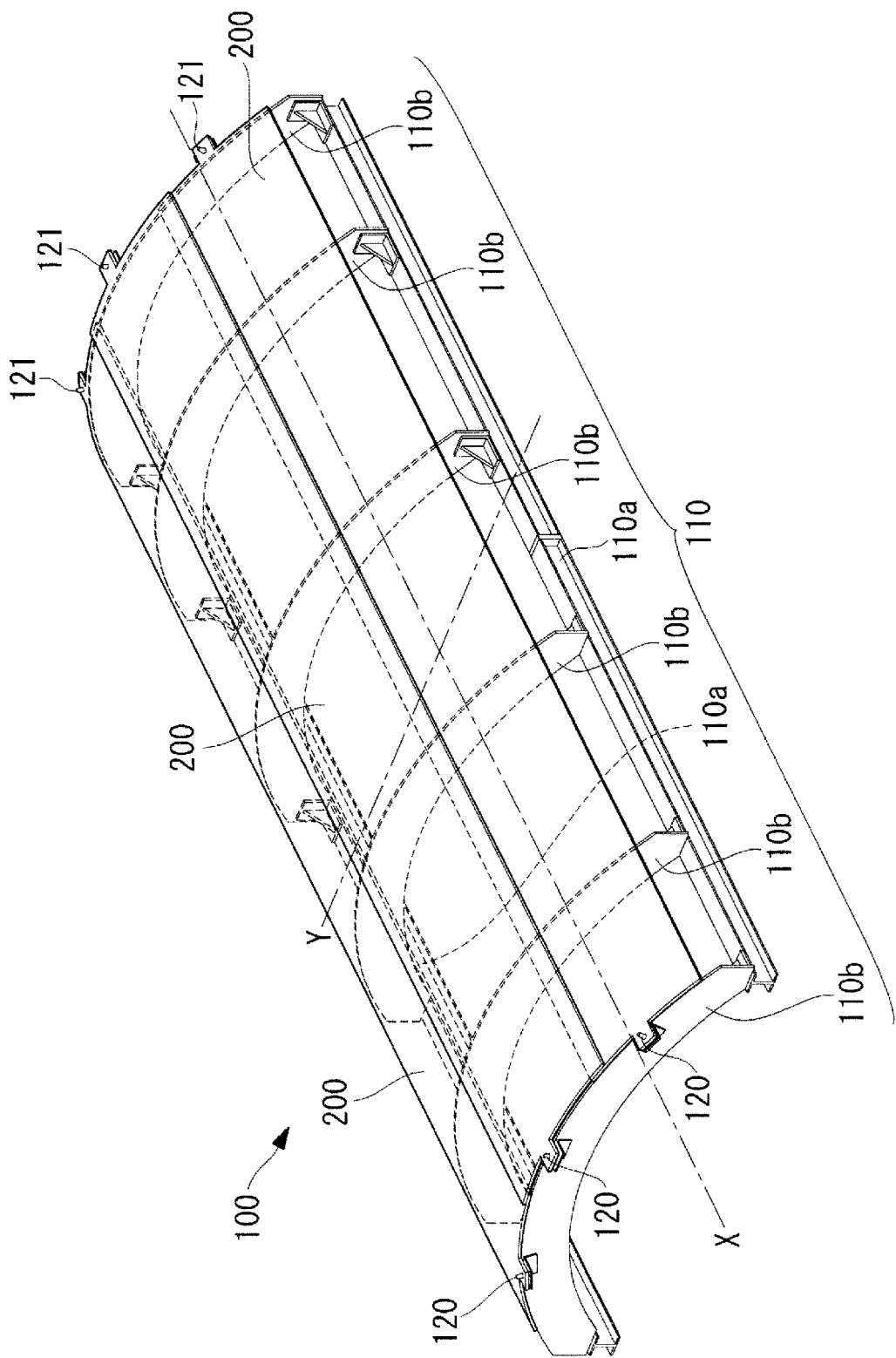
FIG. 3 is a perspective view illustrating an assembly jig in a state in which a plate-like structural member is positioned.

As illustrated in the perspective view of FIG. 3, the three plate-like structural members 200 are positioned with respect to the supporting section 110 in a state where bottom surfaces 200a thereof are supported by the three pairs of positioning sections 120, 121 arranged at three different positions along the axis line Y.

Figure 2:
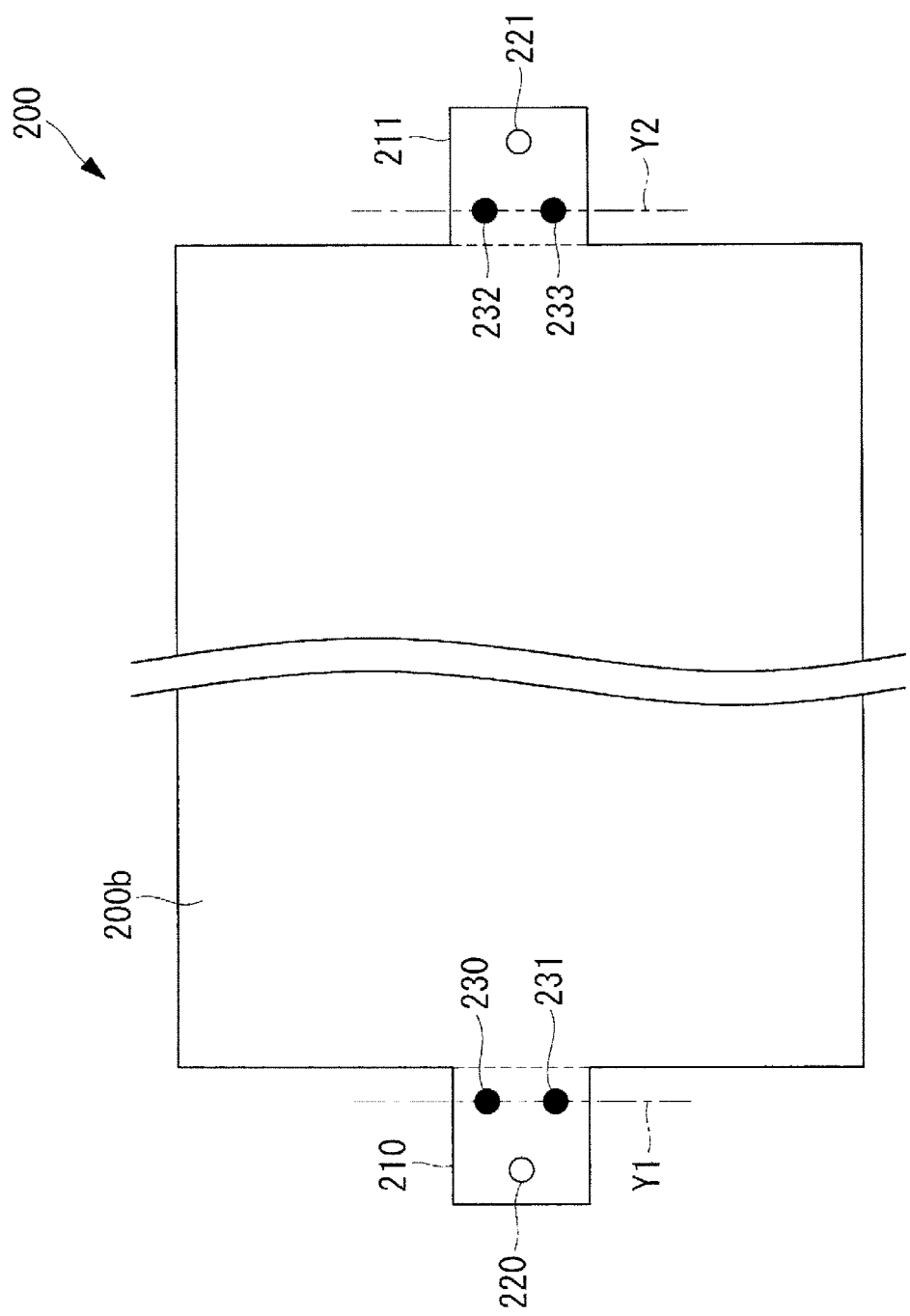
FIG. 2 is a plan view illustrating a plate-like structural member.

Note that although the plate-like structural member 200 illustrated in FIG. 2 is formed in rectangular shape in planar view, the plate-like structural member 200 may be formed according to another aspect.

For example, the plate-like structural member 200 may be a member in which a pair of protruding sections 210, 211 is formed at both end portions of the member having a trapezoidal or another shape.

Next, a configuration of the plate-like structural member 200 will be described while referencing FIG. 2.

The plate-like structural member 200 of the present embodiment is, for example, an elongated structural member used for aircraft fuselages and main wings.

The plate-like structural member 200 may have various lengths in the long side direction as well as the short side direction, for example, the length in the long side direction may be in a range of from 8 to 10 m, and the length in the short side direction may be approximately 2 m.

Additionally, a thickness of the plate-like structural member 200 is, for example, in a range of from 3 to 5 mm.

Various materials may be used for the plate-like structural member 200. An example of the material is an aluminum alloy.

Additionally, the plate-like structural member 200 illustrated in FIG. 2 does not include a through-hole therethrough. However, the plate-like structural member 200 may include one or a plurality of through-holes (e.g., a plurality of through-holes for installing a window, the through-holes being formed at multiple locations in the plate-like structural member 200 used for an aircraft fuselage) formed at one or a plurality of locations.

As illustrated in FIG. 2, the plate-like structural member 200 is formed in a rectangular shape in planar view, and is a plate-like shaped member having the pair of positioning holes 220, 221 at both end portions in the long side direction.

The plate-like structural member 200 includes the pair of protruding sections 210, 211 each formed to protrude outwardly at both end portions in the long side direction thereof.

The pair of positioning holes 220, 221 are positioning holes through which a pair of positioning pins 120a, 121a are inserted, and are formed through the pair of protruding sections 210, 211.

A pair of position detection areas 230, 231 (a first position detection area) are formed on an upper surface 200b (a second surface) of the protruding section 210 provided at one end side of the plate-like structural member 200 where the positioning hole 220 is formed.

Whereas, a pair of position detection areas 232, 233 (a second position detection area) are formed on an upper surface 200b of the protruding section 211 provided on the other end side of the plate-like structural member 200 where the positioning hole 221 is formed.

The pair of position detection areas 230, 231 and the pair of position detection areas 232, 233 are areas that are each imaged by imaging apparatuses 300b, 301b that will be described later, and the center position thereof is determined by a calculation performed by a control apparatus 500.

The pair of position detection areas 230, 231 and the pair of position detection areas 232, 233 are areas that exhibit, for example, a large difference in luminance (contrast) from the upper surface 200b of the plate-like structural member 200 when the areas are imaged by the imaging apparatuses 300b, 301b.

The pair of position detection areas 230, 231 and the pair of position detection areas 232, 233 may be formed, for example, by painting the upper surface 200b of the plate-like structural member 200 or attaching stickers thereto.

Alternatively, the pair of position detection areas 230, 231 and the pair of position detection areas 232, 233 may be, for example, through-holes penetrating the bottom surface 200a and the upper surface 200b of the pair of protruding sections 210 and 211, in a similar manner to the pair of positioning holes 220, 221.

Note that the protruding section 210 preferably includes another region processed to exhibit a large difference in luminance (contrast) from the positioning hole 220 and the pair of position detection areas 230, 231, the other region being separated from the region where the positioning hole 220 and the pair of position detection areas 230, 231 are formed.

For example, the other region of the protruding section 210 is preferably subjected to a surface treatment such as painting, attaching stickers, and sanding, in order to reduce the specularity of surface reflecting external light.

The same as above is applicable to another region in the protruding section 211, where the positioning hole 221 and the pair of position detection areas 232, 233 are not formed.

As illustrated in FIG. 2, the positioning hole 220 is formed at a position apart from the axis line Y1 connecting the pair of position detection areas 230, 231.

Likewise, the positioning hole 221 is formed at a position apart from the axis line Y2 connecting the pair of position detection areas 232, 233.

The following describes the reason why the positioning holes 220, 221 are positioned in such a manner. In a case in which the positioning hole 220 and the pair of position detection areas 230, 231 are arranged on an identical axis line, when the plate-like structural member 200 is rotated around the axis line Y1 connecting the hole and areas, the angle thereof around the axis line Y1 cannot be recognized from the image information collected by the imaging apparatus.

Similarly, in a case in which the positioning hole 221 and the pair of position detection areas 232, 233 are arranged on an identical axis line, when the plate-like structural member 200 is rotated around the axis line Y2 connecting the hole and areas, the angle thereof around the axis line Y2 cannot be recognized from the image information collected by the imaging apparatus.

Next, referring to FIGS. 4 to 6, a process of positioning the plate-like structural member 200 with respect to the assembly jig 100 using the assembling system 600 will be described.

Figure 4:
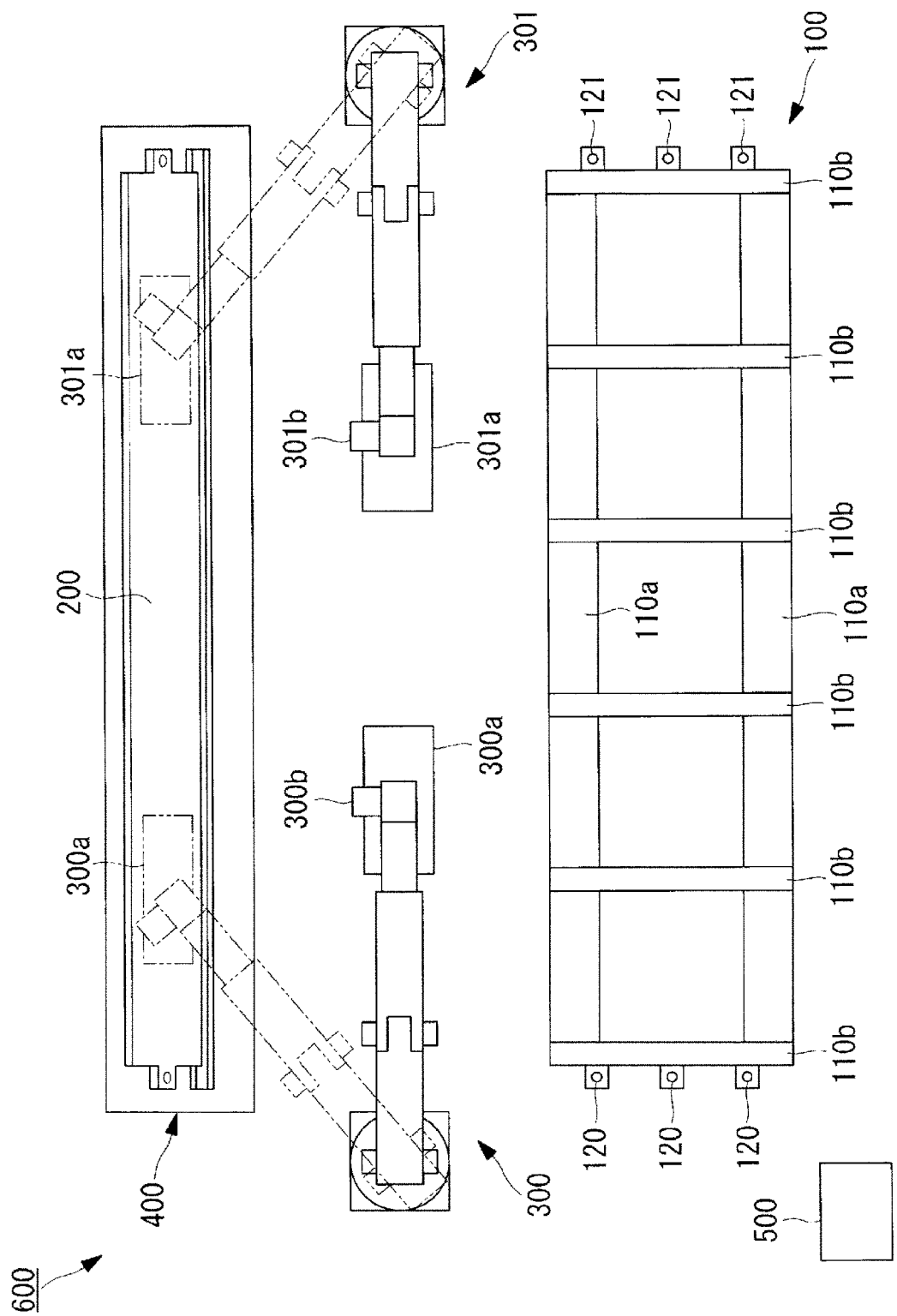
FIG. 4 is a plan view illustrating an assembling system.

As illustrated in FIG. 4, the assembling system 600 includes the assembly jig 100, the plate-like structural member 200, a pair of gripping devices 300, 301 for gripping and moving the plate-like structural member 200, and a supplying stage 400 for temporarily retaining the plate-like structural member 200 for the supply of the plate-like structural member 200, and the control apparatus 500 for controlling the assembling system 600.

The pair of gripping devices 300, 301 is a vertical articulated robot, and is a device capable of positioning suction hands 300a, 301a equipped to the leading end portion thereof, to a freely-selected position and posture in three-dimensional space.

The suction hands 300a, 301a are configured to suction the upper surface 200b of the plate-like structural member 200 by the action of negative pressure.

The imaging apparatuses 300b, 301b are equipped to the leading end portion side of the gripping devices 300, 301.

The imaging apparatus 300b images the protruding section 210 of the plate-like structural member 200 to collect image information and transmit the collected information to the control apparatus 500.

The control apparatus 500 receives from the imaging apparatus 300b the image information and position/posture information on the position and posture of the imaging apparatus 300b when the image information is collected.

The control apparatus 500, from the image information collected by the imaging the protruding section 210, calculates the position of the positioning hole 220 on the image and the position of each of the pair of position detection areas 230, 231 on the image, and then recognizes or calculates the position and angle (the angle around the axis line extending in the long side direction and the angle around the axis line extending in the short side direction) of the protruding section 210 with respect to the position and posture of the imaging apparatus 300b.

Thereafter, the control apparatus 500 recognizes or calculates the position and angle of the protruding section 210 in three-dimensional space, on the basis of both the position/posture information received from the imaging apparatus 300b and the position and angle of the protruding section 210 with respect to the position and posture of the imaging apparatus 300b.

The imaging apparatus 301b images the protruding section 211 of the plate-like structural member 200 to collect image information and transmit the collected information to the control apparatus 500.

The control apparatus 500 receives from the imaging apparatus 301b the image information and position/posture information on the position and posture of the imaging apparatus 301b when the image information is collected.

The control apparatus 500, from the image information collected by the imaging the protruding section 211, calculates the position of the positioning hole 221 on the image and the position of each of the position detection areas 232, 233 on the image, and thus recognizes or calculates the position and angle (the angle around the axis line extending in the long side direction and the angle around the axis line extending in the short side direction) of the protruding section 211 with respect to the position and posture of the imaging apparatus 301b.

Thereafter, the control apparatus 500 recognizes or calculates the position and angle of the protruding section 211 in three-dimensional space, on the basis of both the position/posture information received from the imaging apparatus 301b and the position and angle of the protruding section 211 with respect to the position and posture of the imaging apparatus 301b.

With the above process, the control apparatus 500 recognizes or calculates the position and angle in three-dimensional space of the protruding section 210 and the protruding section 211 of the plate-like structural member 200 retained on the supplying stage 400.

The pair of gripping devices 300, 301 move the suction hands 300a and 301a from the initial position indicated by the solid line in FIG. 4 to the position indicated by the dashed line in FIG. 4, and allows the suction hands 300a and 301a to suction the upper surface of the plate-like structural member 200 by the action of negative pressure.

At this time, the gripping device 300 moves the suction hand 300a to the upper surface of the plate-like structural member 200, on the basis of the position and angle of the protruding section 210 calculated by the control apparatus 500.

Similarly, the gripping device 301 moves the suction hand 301a to the upper surface of the plate-like structural member 200, on the basis of the position and angle of the protruding section 211 calculated by the control apparatus 500.

Figure 5:
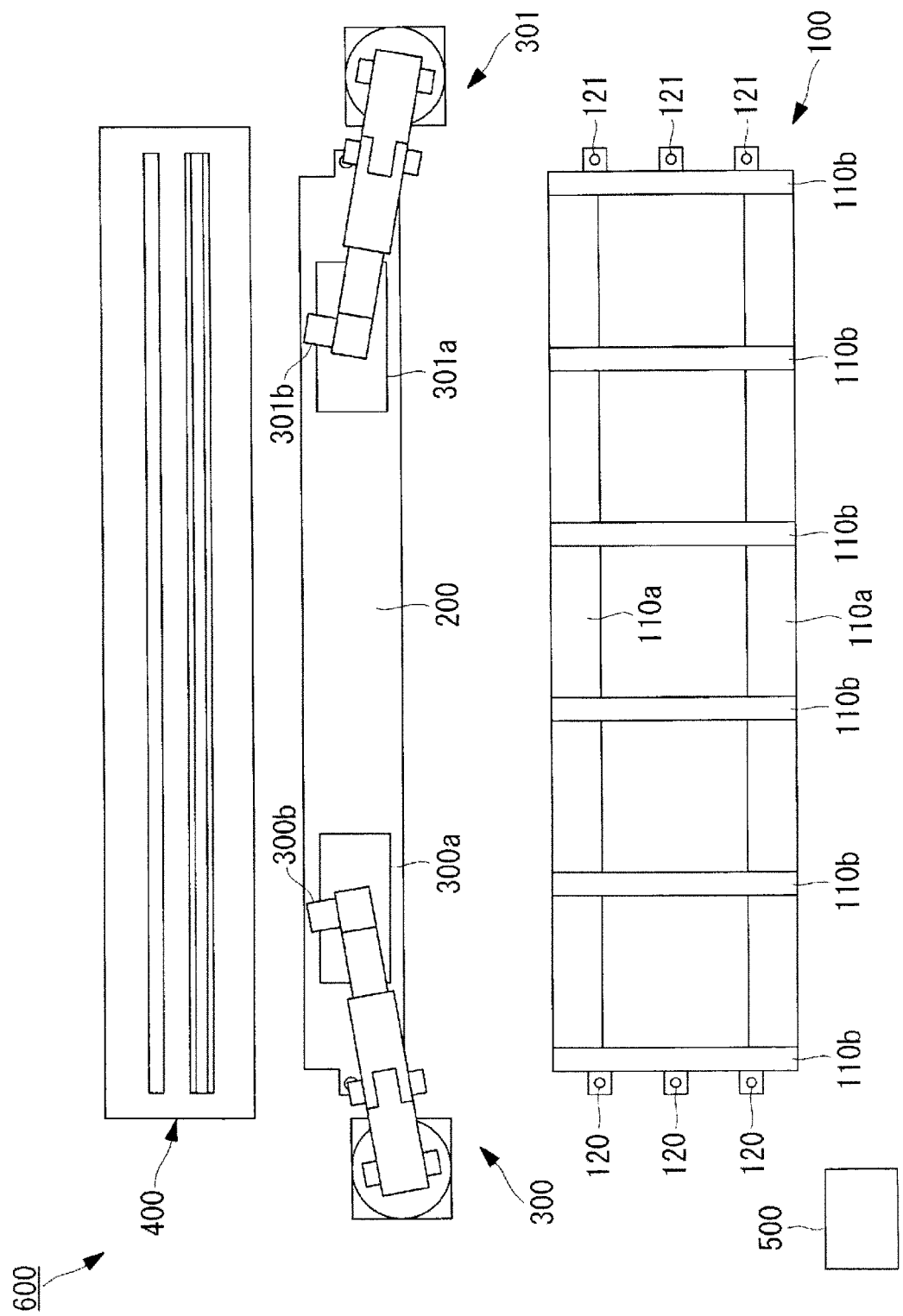
FIG. 5 is a plan view illustrating an assembling system.

The pair of gripping devices 300, 301, as illustrated in FIG. 5, cooperates with each other to move the plate-like structural member 200 retained on the supplying stage 400 toward the assembly jig 100 in a state where the both end sides in the long side direction of the plate-like structural member 200 having an elongated shape are suctioned by the suction hands 300a, 301a.

Figure 6:
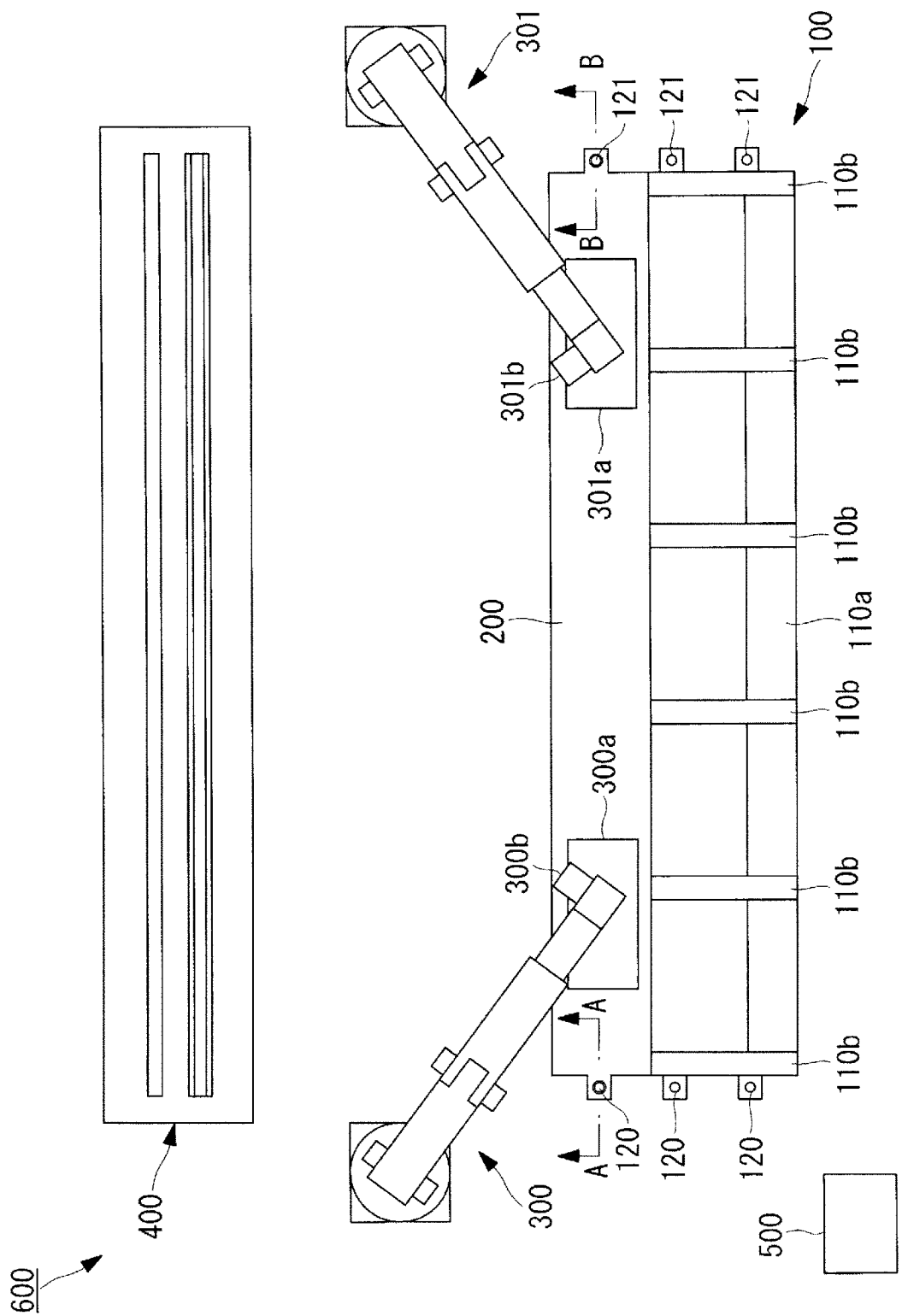
FIG. 6 is a plan view illustrating an assembling system.

The pair of gripping devices 300, 301, as illustrated in FIG. 6, moves the plate-like structural member 200 so that the pair of positioning holes 220, 221 are disposed above the pair of positioning sections 120, 121 of the assembly jig 100.

Thereafter, the pair of gripping devices 300, 301 moves the plate-like structural member 200 in a downward direction so that the pair of positioning holes 220, 221 are positioned at the pair of positioning sections 120, 121.

Next, the positioning sections 120, 121 of the assembly jig 100 will be described while referencing FIGS. 7 and 8.

Figure 7:
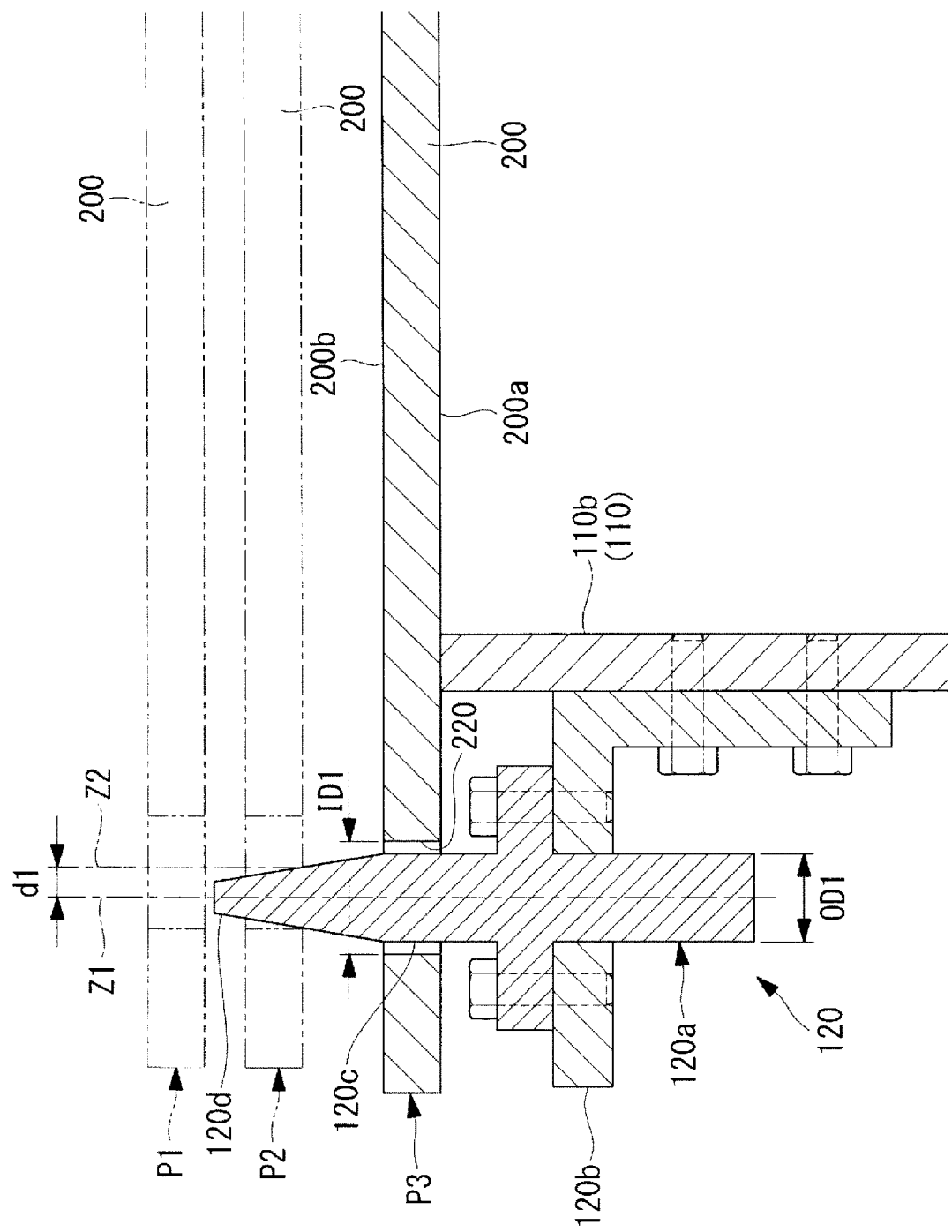
FIG. 7 is a cross-sectional view taken in a direction of A-A line of positioning pin illustrated in FIG. 6.
Figure 8:
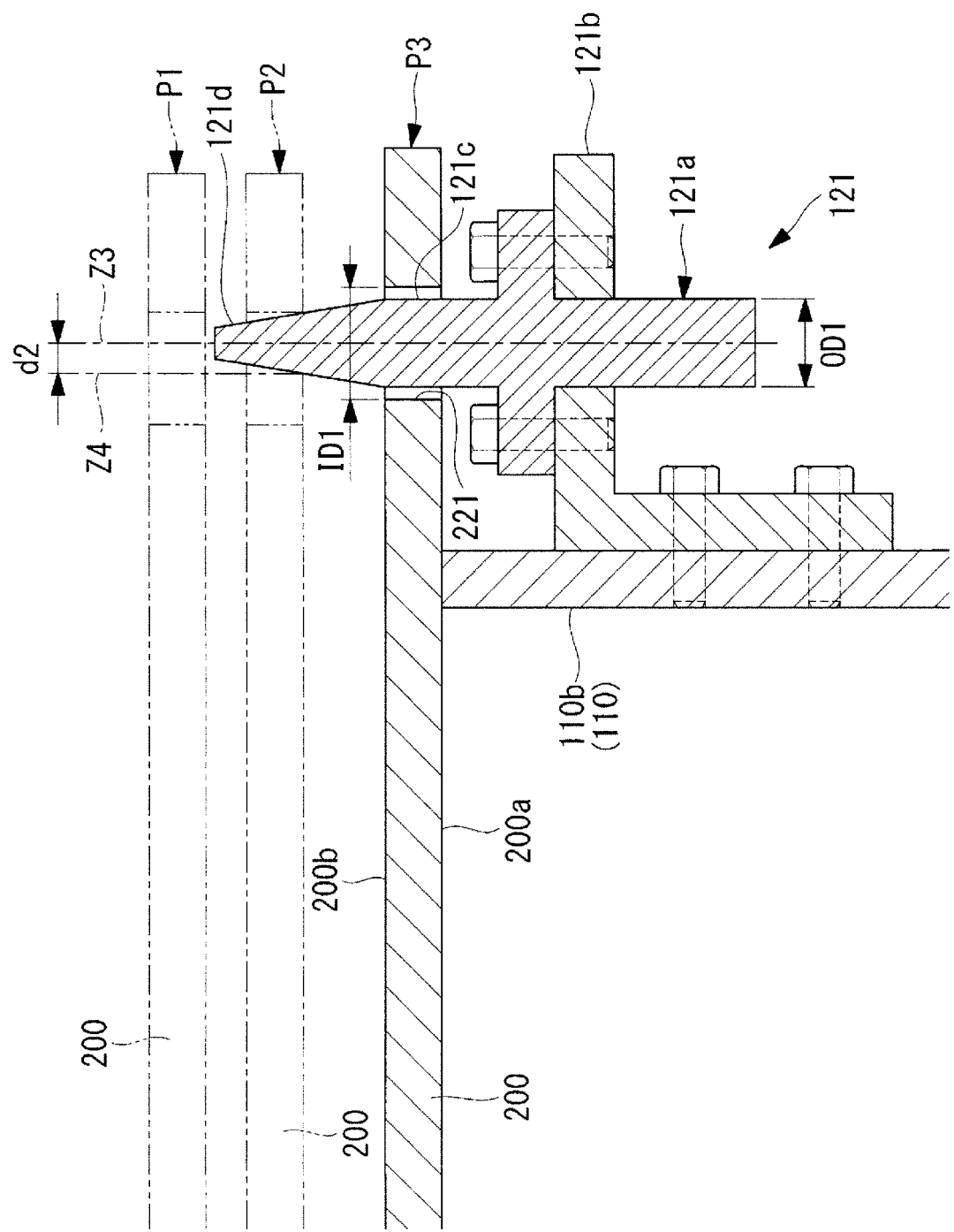
FIG. 8 is a cross-sectional view taken in a direction of B-B line of positioning pin illustrated in FIG. 6.

FIG. 7 is a cross-sectional view taken in a direction of A-A line of the positioning section 120 illustrated in FIG. 6, and FIG. 8 is a cross-sectional view taken in a direction of B-B line of the positioning section 121 illustrated in FIG. 6.

As illustrated in FIG. 7, the positioning section 120 includes the positioning pin 120a (the positioning protrusion) to be inserted into the positioning hole 220 of the plate-like structural member 200, and an attaching member 120b for attaching the positioning pin 120a to the second supporting member 110b.

In the following, only one of the three pairs of positioning sections 120, 121 illustrated in FIGS. 4 to 6 will be described, and the description about the other two pairs will be omitted because the same configuration as the above is applicable thereto.

Further, in the examples illustrated in FIGS. 4 to 6, one piece of the plate-like structural member 200 is mounted on the assembly jig 100, and in the assembling system 600 of the present embodiment, the other two plate-like structural members 200 placed on the supplying stage 400 may be continuously supplied to the other two pairs of positioning sections 120, 121, and a description thereof will be therefore omitted.

The attaching member 120b is fastened and affixed to the second supporting member 110b with a plurality of fastening bolts, while the positioning pin 120a is fastened and affixed to the attaching member 120b with a plurality of fastening bolts.

As such, the positioning pin 120a is attached to the second supporting member 110b via the attaching member 120b.

As illustrated in FIG. 7, the positioning pin 120a is a member formed in an axial shape extending along the axis line Z1 and is to be inserted into the positioning hole 220 in a direction from the bottom surface 200a of the plate-like structural member 200 toward the upper surface 200b thereof.

As illustrated in FIG. 7, the positioning pin 120a forms a tapered shape while the outer diameter thereof decreases, from a value of OD1, from base end portion 120c toward a leading end portion 120d.

The portion ranging from the base end portion 120c to the leading end portion 120d of the positioning pin 120a is formed to be a circular truncated cone-like portion having circular cross sections.

As illustrated by the solid line in FIG. 7, the positioning pin 120a is disposed such that the base end portion 120c thereof is inserted into the positioning hole 220 while the bottom surface 200a of the plate-like structural member 200 is being supported by the second supporting member 110b.

As illustrated in FIG. 7, an outer diameter OD1 of the base end portion 120c is less than an inner diameter ID1 of the positioning hole 220 into which the base end portion 120c is inserted.

A differential length between the inner diameter ID1 and the outer diameter OD1 is defined not greater than the double of the positioning error value (e.g., 0.2 mm) allowable when the plate-like structural member 200 is positioned with the assembly jig 100.

Thereby, the gap formed between the outer circumferential surface of the base end portion 120c and the inner circumferential surface of the positioning hole 220 is maintained within a positioning error range.

As illustrated in FIG. 7, the plate-like structural member 200 is gripped and moved in a downward direction by the gripping devices 300, 301 in the order of a position P1, a position P2, and a position P3.

The leading end portion 120d is not allowed to be disposed inside of the region where the positioning hole 220 is disposed at the position P1 in a case where the positioning accuracy of the gripping device 300, 301 exceeds the allowable positioning error value, and the outer diameter of the leading end portion 120d of the positioning pin 120a is equal to the outer diameter OD1 of the base end portion 120c.

Thus, the leading end portion 120d of the positioning pin 120a is not allowed to be inserted into the positioning hole 220.

The outer diameter of the leading end portion 120d of the positioning pin 120a is therefore less than the outer diameter OD1 of the base end portion 120c, in the present embodiment.

Thus, as illustrated in FIG. 7, the leading end portion 120d is disposed inside of the region where the positioning hole 220 is disposed at the position P1.

The leading end portion of the positioning pin 120a is therefore allowed to be inserted into the positioning hole 220 formed through the plate-like structural member 200 even when the positioning accuracy in carrying the plate-like structural member 200 to the assembly jig 100 is not sufficiently ensured.

As illustrated in FIG. 7, the gripping device 300, 301 moves the plate-like structural member 200 in a downward direction from the position P1 so that the leading end portion 120d of the positioning pin 120a is inserted into the positioning hole 220, and thus the plate-like structural member 200 is moved to the position P2.

The inner circumferential surface of the positioning hole 220 comes, at the position P2, in contact with the outer circumferential surface on the tapered shape of the positioning pin 120a.

At the position P2, the axis line Z2 becoming the central axis of the positioning hole 220 is being apart by a distance d1 from the axis line Z1 becoming the central axis of the positioning pin 120a.

When the gripping device 300, 301 moves the plate-like structural member 200 in a downward direction further from the position P2, the reaction force received from the outer circumferential surface on the tapered shape of the positioning pin 120a causes the plate-like structural member 200 to be moved in a direction along which the axis line Z2 of the positioning hole 220 approaches the axis line Z1 of the positioning pin 120a (positioning process).

When the plate-like structural member 200 is moved to the position P3 and then the base end portion 120c of the positioning pin 120a is placed in a state of being inserted into the positioning hole 220, the distance between the axis line Z2 of the positioning hole 220 and the axis line Z1 of the positioning pin 120a falls within the allowable positioning error value.

After three plate-like structural members 200 are positioned by three pairs of positioning pins 120a, 121a, these three plate-like structural members 200 are assembled by a process such as riveting.

After the assembly of the three plate-like structural members 200 is completed, the protruding sections 210, 211 of the three plate-like structural members 200 are cut off with a cutting apparatus (not illustrated).

The protruding sections 210, 211 are cut off because the protruding sections 210, 211 are unneeded sections as the final product.

As such, the positioning holes 220, 221, the pair of position detection areas 230, 231, and the pair of position detection areas 232, 233 are formed at the protruding sections 210, 211 to be cut off because these are unneeded sections as the final product.

Thus, the protruding sections 210, 211 which are not utilized in the final product can be used for an accurate recognition of the position and angle of the plate-like structural member 200.

As stated above, the configuration of the positioning section 120 is described while referencing FIG. 7. The configuration of the positioning section 121 illustrated in FIG. 8 is substantially the same as the configuration of the positioning section 120. As such, the description thereof will be omitted.

The positioning pin 121a, the attaching member 121b, the base end portion 121c, and the leading end portion 121d illustrated in FIG. 8 correspond to the positioning pin 120a, the attaching member 120b, the base end portion 120c, and the leading end portion 120d illustrated in FIG. 7, respectively.

Further, the axis line Z3 to be the central axis of the positioning pin 121a, the axis line Z4 to be the central axis of the positioning hole 221, and the distance d2 between the axis line Z3 and the axis line Z4 illustrated in FIG. 8 correspond to the axis line Z1 to be the central axis of the positioning pin 120a, the axis line Z2 to be the central axis of the positioning hole 220, and the distance d1 between the axis line Z1 and the axis line Z2 illustrated in FIG. 7, respectively.

The functions and effects of the present embodiment stated above will be described.

According to the plate-like structural member 200 of the present embodiment, the positioning holes 220, 221 are formed through both end portions in long side direction, and the position detection areas 230, 231 and the position detection areas 232, 233 are formed on each of both end portions in the long side direction.

Thereby, the position and angle of the plate-like structural member 200 (the angle around the axis line extending in the long side direction and the angle around the axis line extending in the short side direction) can be accurately recognized at each of both end portions in the long side direction that are positioned at the positioning pin 120a, 121a of the assembly jig 100.

Specifically, the recognition accuracy is significantly enhanced as compared to a case where the position and angle of the plate-like structural member 200 are recognized with respect to the shapes of both end portions of the plate-like structural member 200.

This is because the use of the shapes of the both end portions of the plate-like structural member 200 as a reference may lead to an inaccurate recognition due to an error in processing accuracy unless the processing accuracy of the shape is ensured.

Additionally, since the positioning hole 220 (221) is formed at a position apart from the axis line connecting the pair of position detection areas 230, 231, even if the plate-like structural member 200 is positioned at any angle, the angle of the plate-like structural member 200 can be reliably recognized using the image information collected by imaging the positioning hole 220 (221) and the pair of position detection areas 230, 231 (232, 233).

In a case in which the positioning hole 220 (221) and the pair of position detection areas 230, 231 (232, 233) are arranged on an identical axis line, when the plate-like structural member 200 is rotated around the axis line connecting the hole and areas, the angle around the axis line cannot be recognized from the image information.

As described above, the plate-like structural member 200 of the present embodiment allows the position and angle of a portion to be positioned on the assembly jig 100 to be accurately recognized.

According to the plate-like structural member 200 of the present embodiment, the plate-like structural member 200 is positioned with respect to the assembly jig 100 and the assembling work necessitated is performed, and thereafter the pair of protruding sections 210, 211 is cut off. This configuration allows a detection of the position and posture of the plate-like structural member 200 to be accurately recognized without performing any process on a portion necessary for the final product.

According to the plate-like structural member 200 of the present embodiment, the calculation accuracy is increased in calculating the positions of the pair of position detection areas 230, 231 from the image information collected by imaging the pair of position detection areas 230, 231 with the imaging apparatus 300b.

Similarly, the calculation accuracy is increased in calculating the positions of the pair of position detection areas 232, 233 from the image information collected by imaging the pair of second position detection areas 232, 233 with the imaging apparatus 301b.

According to the plate-like structural member 200 of the present embodiment, the pair of position detection areas 230, 231 and the pair of position detection areas 232, 233 may be through-holes.

Since a process for forming a through-hole through the plate-like structural member 200 is a process in which the through-hole can be positioned with relatively high accuracy, the through-hole is used for both the pair of position detection areas 230, 231 and the pair of position detection areas 232, 233 so that the detection accuracy in the pair of position detection areas 230, 231 and the pair of second position detection areas 232, 233 is enhanced.

REFERENCE SIGNS LIST

100 Assembly jig (positioning device)
110 Supporting section
110a First supporting member
110b Second supporting member
120, 121 Positioning section
120a Positioning pin (positioning protrusion)
120b Attaching member
120c Base end portion
120d Leading end portion
200 Plate-like structural member (structural body)
200a Bottom surface (first surface)
200b Upper surface (second surface)
210, 211 Protruding section
220, 221 Positioning hole
230, 231 Position detection area (first position detection area)
232, 233 Position detection area (second position detection area)
300, 301 Gripping device
300a, 301a Suction hand
300b, 301b Imaging apparatus
400 Supply stage
500 Control apparatus
600 Assembling system
OD1 Outer diameter
ID1 Inner diameter

The invention claimed is:

1. A structural body formed in a plate-like shape and an elongated shape having a short side direction and a long side direction and positioned with respect to a positioning device, the positioning device including a pair of positioning protrusions and supporting a first surface of the structural body, the structural body comprising:
   a pair of positioning holes formed through both end portion in the long side direction, the pair of positioning protrusions being inserted into the pair of positioning holes;
   a pair of first position detection areas formed on a second surface of a first end portion through which a first hole of the pair of positioning holes is formed; and
   a pair of second position detection areas formed on the second surface of a second end portion through which a second hole of the pair of positioning holes is formed,
   wherein the first hole of the pair of positioning holes is formed apart from an axis line connecting the pair of first position detection areas,
   the second hole of the pair of positioning holes is formed apart from an axis line connecting the pair of second position detection areas,
   a pair of protruding sections protruding outwardly in the long side direction are formed at the both end portions, the length of the pair of protruding sections in the short side direction being shorter than the length of the structural body in the short side direction,
   the first hole of the pair of positioning holes and the pair of first position detection areas are formed at a first section of the protruding sections,
   the second hole of the pair of positioning holes and the pair of second position detection areas are formed at a second section of the protruding sections,
   the second surface of the first section of the pair of protruding sections includes a first region processed to increase a difference in luminance from the pair of first position detection areas, the first region being a region where the pair of first positioning detection areas are not formed and being subjected to a surface treatment in order to reduce specularity of surface reflecting external light, and the second surface of the second section of the pair of protruding sections includes a second region processed to increase a difference in luminance from the pair of second position detection areas, the second region being a region where the pair of second positioning detection areas are not formed and being subjected to a surface treatment in order to reduce specularity of surface reflecting external light.

2. The structural body according to claim 1, wherein the pair of first position detection areas are through-holes each penetrating the first surface and the second surface.

* * * * *